(12) United States Patent
Zhang

(10) Patent No.: US 8,170,776 B2
(45) Date of Patent: May 1, 2012

(54) METHOD AND DEVICE FOR CONTROLLING AN INTERNAL COMBUSTION ENGINE

(75) Inventor: Hong Zhang, Tegernheim (DE)

(73) Assignee: Continental Automotive GmbH, Hannover (DE)

(*) Notice: Subject to any disclaimer, the term of this patent is extended or adjusted under 35 U.S.C. 154(b) by 275 days.

(21) Appl. No.: 12/520,598

(22) PCT Filed: Dec. 19, 2007

(86) PCT No.: PCT/EP2007/064179
§ 371 (c)(1),
(2), (4) Date: Dec. 14, 2009

(87) PCT Pub. No.: WO2008/080843
PCT Pub. Date: Jul. 10, 2008

(65) Prior Publication Data
US 2010/0095929 A1  Apr. 22, 2010

(30) Foreign Application Priority Data
Dec. 27, 2006  (DE) .......................... 10 2006 061 659

(51) Int. Cl.
*F02M 7/28* (2006.01)
(52) U.S. Cl. ......... 701/110; 701/111; 123/435; 123/436
(58) Field of Classification Search .......... 123/435–436; 701/103–105, 110–111
See application file for complete search history.

(56) References Cited

U.S. PATENT DOCUMENTS

| | | | |
|---|---|---|---|
| 4,896,642 A | | 1/1990 | Washino et al. |
| 5,803,046 A | * | 9/1998 | Bolander et al. ......... 123/406.55 |
| 5,896,845 A | * | 4/1999 | Matsuda et al. ............. 123/480 |
| 5,983,867 A | | 11/1999 | Stuber et al. |
| 7,823,563 B2 | * | 11/2010 | Jankovic et al. .............. 123/436 |
| 7,841,316 B2 | * | 11/2010 | Inoue ............................ 123/299 |
| 2007/0157599 A1 | * | 7/2007 | Gaertner |
| 2009/0018746 A1 | * | 1/2009 | Miller et al. .................. 701/102 |

(Continued)

FOREIGN PATENT DOCUMENTS
DE  3833124 A1  5/1989
(Continued)

OTHER PUBLICATIONS
Robert Bosch GmbH, Dieselmotor-Management Seiten 324-327, Wiesbadan, Vieweg, Book 2004 DE, Feb. 2, 2005.*
(Continued)

*Primary Examiner* — Hai Huynh
(74) *Attorney, Agent, or Firm* — King & Spalding L.L.P.

(57) ABSTRACT

In order to control an internal combustion engine with self-ignition of the air/fuel mixture, at least one injection parameter with respect to fuel metering is determined as a function of at least one operating variable, assuming a steady-state operating state. If a transient operating state is present, a target combustion chamber temperature is determined for the steady-state operating state as a function of at least one of the operating variables. An actual combustion chamber temperature is determined as a function of a physical model for the transient operation, depending on the target combustion chamber temperature and at least one of the operating variables. A correction value is determined for the at least one injection parameter as a function of the target and actual combustion chamber temperatures. The fuel valve is controlled as a function of the at least one injection parameter and the associated correction value.

20 Claims, 2 Drawing Sheets

U.S. PATENT DOCUMENTS

2009/0301066 A1* 12/2009 Sindano et al. .................. 60/286
2010/0088006 A1* 4/2010 Ito et al. ......................... 701/103

FOREIGN PATENT DOCUMENTS

| | | | |
|---|---|---|---|
| DE | 19636451 A | | 3/1998 |
| DE | 19754354 C1 | * | 7/1999 |
| DE | WO 2004009031 | * | 10/2004 |
| EP | 1647690 A1 | * | 4/2006 |
| JP | 2008-309006 | * | 12/2008 |

OTHER PUBLICATIONS

International Search Report PCT/EP2007/064179, 6 pages, May 16, 2008.*

German Office Action, German Application No. 10 2006 061 659.6 4 pages, Jun. 12, 2007.*

German Office Action, German application No. 102006061659.6-26, 3 pages, Jun. 25, 2009.

* cited by examiner

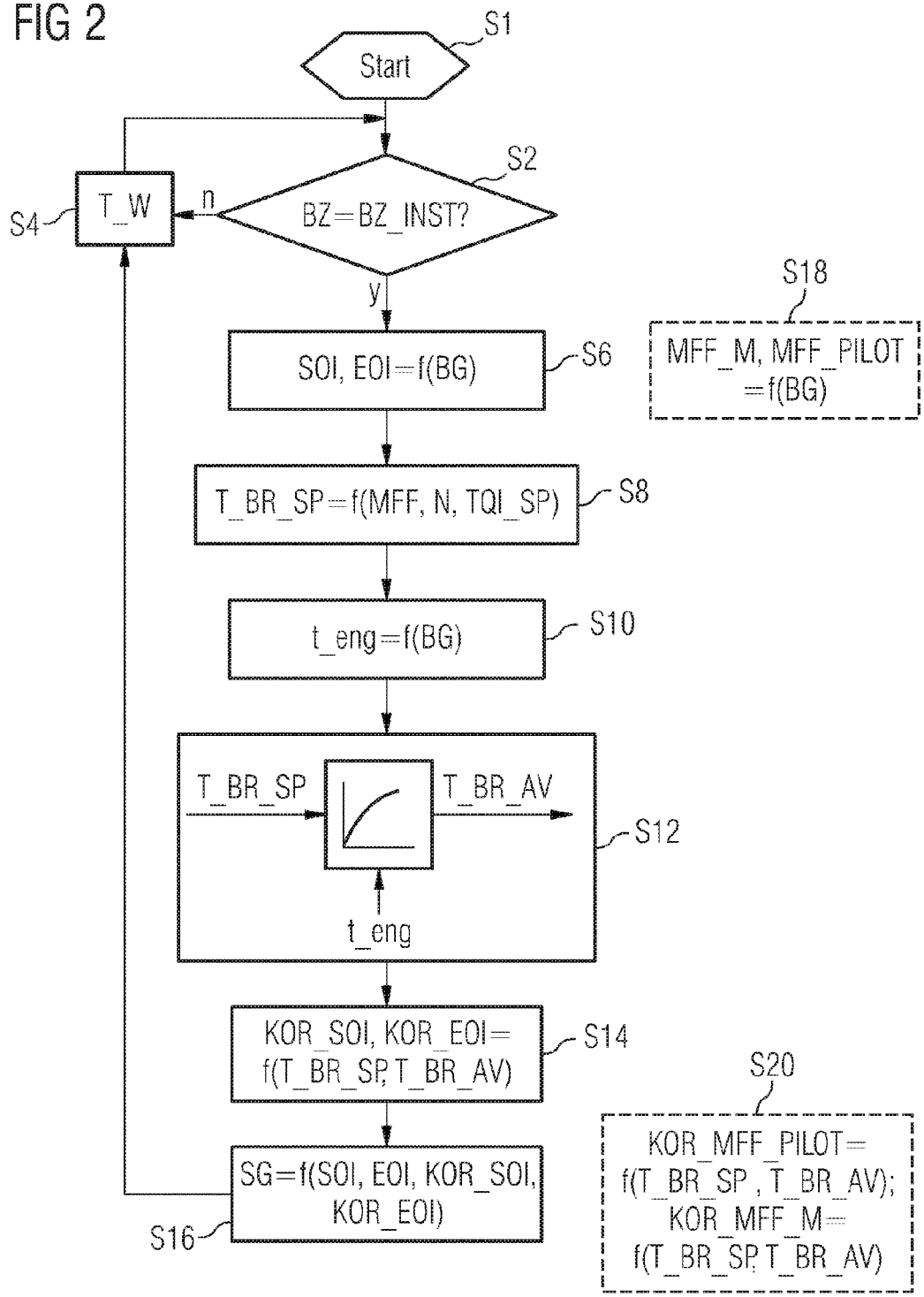

METHOD AND DEVICE FOR CONTROLLING AN INTERNAL COMBUSTION ENGINE

CROSS-REFERENCE TO RELATED APPLICATIONS

This application is a U.S. National Stage Application of International Application No. PCT/EP2007/064179 filed Dec. 19, 2007, which designates the United States of America, and claims priority to German Application No. 10 2006 061 659.6 filed Dec. 27, 2006, the contents of which are hereby incorporated by reference in their entirety.

TECHNICAL FIELD

The invention relates to a method and a device for controlling an internal combustion engine with self-ignition of the air/fuel mixture and the metering of fuel via a fuel injection valve.

BACKGROUND

The increasingly strict statutory regulations on permissible pollutant emissions of motor vehicles, in which internal combustion engines are mounted, require that the pollutant emissions be kept as low as possible in the operation of the internal combustion engine. This can take place on the one hand by reducing the pollutant emissions, which form during the combustion of the air/fuel mixture in the respective cylinder of the internal combustion engine. On the other hand, exhaust gas aftertreatment systems are being used in internal combustion engines, that convert the pollutants formed during the combustion process of the air/fuel mixture in the respective cylinders into harmless substances.

In particular, if a transient operating state is present, it is a challenge to guarantee low pollutant emissions because in such a transient operating state, very high pollutant emissions can very easily be produced.

SUMMARY

According to various embodiments, a method and a device for controlling an internal combustion engine can be created, either of which contribute to the generation of low pollutant emissions.

According to an embodiment, a method for controlling an internal combustion engine with self-ignition of the air/fuel mixture and the metering of fuel via a fuel injection valve, may comprise the steps of: —at least one injection parameter with respect to the metering of fuel as a function of at least one operating variable of the internal combustion engine under the assumption of a steady-state operating state is determined, —in the case of the presence of a transient operating state: —a target combustion chamber temperature is determined for the steady-state operating state as a function of at least one of the operating variables, —an actual combustion chamber temperature is determined as a function of a physical model for a transient operation as a function of the target combustion chamber temperature and at least one of the operating variables, —as a function of the target combustion chamber temperature and the actual combustion chamber temperature, a correction value is determined for the at least one injection parameter and —the fuel injection valve is controlled as a function of the at least one injection parameter and the allocated correction value.

According to a further embodiment, the target combustion chamber temperature can be determined as a function of an air mass flow and/or a rotational speed and/or a torque to be set. According to a further embodiment, the physical model may comprise one filter. According to a further embodiment, the filter can be a filter of the first order. According to a further embodiment, a filter time constant can be determined as a function of the air mass flow. According to a further embodiment, the injection parameter can be a crankshaft-related position of an injection to be carried out. According to a further embodiment, the injection parameter can be a crankshaft-related position of a pre-injection to be carried out. According to a further embodiment, the injection parameter can be a crankshaft-related position of a main injection to be carried out. According to a further embodiment, the injection parameter can be a quantity of fuel to be metered. According to a further embodiment, the injection parameter can be a pre-injection quantity. According to a further embodiment, the injection parameter can be a main injection quantity.

According to another embodiment, a device in order to control an internal combustion engine with self-ignition of the air/fuel mixture and the metering of fuel by means of a fuel injection valve, may be embodied in order to, —determine at least one injection parameter with respect to the metering of fuel as a function of at least one operating variable of the internal combustion engine under the assumption of a steady-state operating state, —on the presence of a transient operating state: —determine a target combustion chamber temperature for the steady-state operating state as a function of at least one of the operating variables, —determine an actual combustion chamber temperature as a function of a physical model for the transient operation as a function of the target combustion chamber

BRIEF DESCRIPTION OF THE DRAWINGS

Exemplary embodiments are explained in more detail below using schematic drawings. Wherein;

FIG. 2 shows a sequence diagram of a program for controlling the internal combustion engine.

In all the figures, the same reference characters are used to refer to elements of the same construction or function.

DETAILED DESCRIPTION

Figure 1:
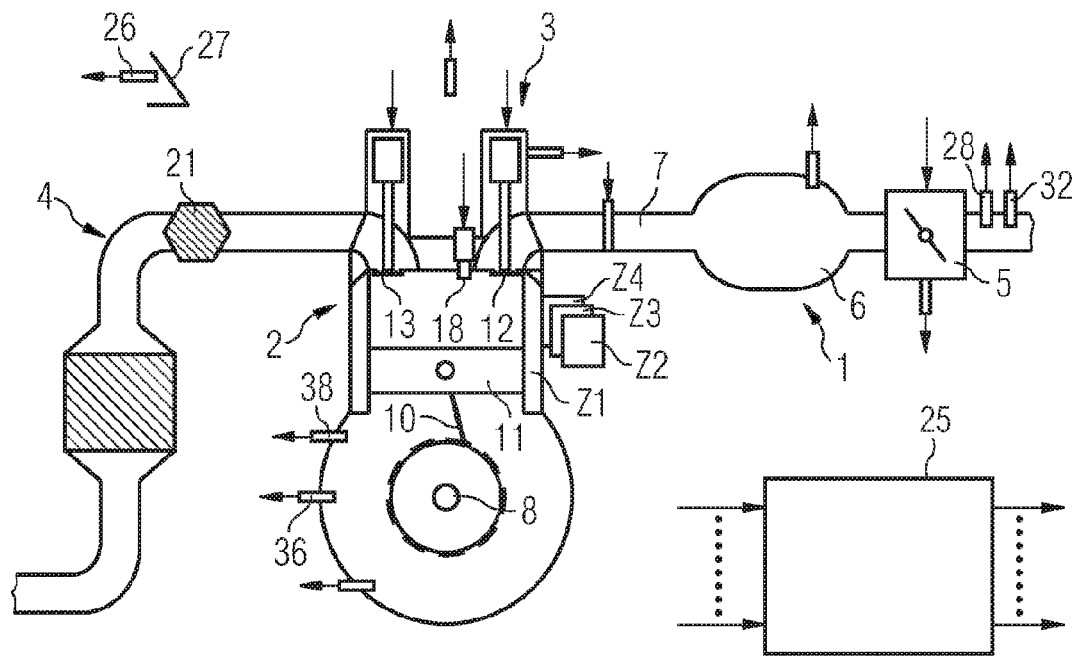
FIG. 1 shows an internal combustion engine with a control device.

The various embodiments relate to a method and a corresponding device for controlling an internal combustion engine with self-ignition of the air/fuel mixture and the metering of fuel via a fuel injection valve. In particular, in the case of diesel internal combustion engines, self-ignition of the air/fuel mixture takes place. However, combustion methods for gasoline internal combustion engines with self-ignition of the air/fuel mixture are also known.

At least one injection parameter with respect to the metering of fuel is determined as a function of at least one operating variable of the internal combustion engine, assuming a steady-state operating state. If a transient operating state is present, a target combustion chamber temperature for the steady-state operating state is determined as a function of at least one of the operating variables of the internal combustion engine. In addition, if a transient operating state is present, an actual combustion chamber temperature is determined as a function of a physical model for the transient operation of the internal combustion engine as a function of the target combustion chamber temperature and at least one of the operating variables of the internal combustion engine. Such a physical model can for example be determined by means of tests, for example, on an engine dynamometer, or can also for example be parameterized by means of corresponding simulations. In addition, if a transient operating state is present, a correction value is determined for the at least one injection parameter as a function of the target combustion chamber temperature and the actual combustion chamber temperature. The fuel injection valve is controlled as a function of the at least one injection parameter and the assigned correction value. In this way it is possible that, on the one hand, the—at least one—injection parameter can be determined in a simple manner, by means of which simply by the presence of a steady-state operating state, an operation of the combustion engine with low emissions can be guaranteed specifically in the case of the corresponding parameterizing of the first injection parameter.

However, over and above that, also in the transient operating state favorable consumption can be guaranteed very simply and effectively and high pollutant emissions, in particular NOX emissions, can be decreased in a significant manner. It has been shown here that the combustion chamber temperature is in this respect a particularly characteristic measurement and by the simple determination of the target combustion chamber temperature and the actual combustion chamber temperature and the determination of the correction values that depend on it, and the effective reduction of the pollutant emissions and also the consumption is possible in a particularly simple manner during transient operation. Over and above that, it is also possible in said way that during the transient operating state, favorable acoustics can be maintained during the combustion.

The target combustion chamber temperature as well as the actual combustion chamber temperature are preferably characteristic of the temperature in the combustion chamber at a given crankshaft angle within one working cycle of an internal combustion engine. It is in particular characteristic of a maximum temperature within the working cycle in question.

In accordance with an embodiment, the target combustion chamber temperature is determined as a function of an air mass flow and/or a rotational speed and/or a torque to be adjusted. This is particularly simple and nevertheless makes possible a sufficiently accurate determination of the combustion chamber temperature that is characteristic of the steady-state operation.

In accordance with a further advantageous embodiment, the physical model comprises a filter. In this way, the physical model can be implemented in a particularly simple manner and supply sufficiently accurate actual combustion chamber temperatures. In this context, it is particularly advantageous if the filter is a filter of the first order. However, this can be implemented in a particularly simple manner using computer-aided methods and it has also surprisingly proved that a filter of the first order, in particular a PT1 filter, models the actual curve of the actual combustion chamber temperature very well during the transient operating state.

In accordance with a further advantageous embodiment, the filter time constant is determined as a function of the air mass flow. In this way, the actual combustion chamber temperature can be determined in a particularly accurate manner.

In accordance with a further embodiment, the injection parameter is a crankshaft-related position of an injection to be carried out. In this way, a combustion center of the air/fuel mixture can simply be influenced specifically with a view to reducing pollutant emissions. In this context, it is advantageous if the injection parameter is a crankshaft-related position of a pre-injection to be carried out, because in this way a start of the combustion of the air/fuel mixture in relation to a main injection can be influenced in a particularly targeted manner.

In accordance with a further advantageous embodiment, the injection parameter is a crankshaft-related position of a main injection to be carried out. In this way, a combustion center and thus a combustion chamber temperature can be set particularly accurately.

In addition, it is also advantageous if the injection parameter is a quantity of fuel to be metered. In this way, a more favorable torque curve can be implemented in a simple manner.

In this context, it is particularly advantageous if the injection parameter is a pre-injection quantity. With regard to this, it has been proven that by means of the pre-injection quantity, the pollutant emissions can be significantly influenced. In addition, it is also very advantageous in this context, if the injection parameter is a main injection quantity. In this way, a favorable torque curve can be implemented in a particularly accurate way.

An internal combustion engine (FIG. 1) comprises an intake section 1, an engine 2, a cylinder head 3, and an exhaust manifold 4. In advantageous way, the intake section 1 comprises a throttle valve 5, which can also be used in an internal combustion engine with self-ignition of the air/fuel mixture for example together with an exhaust gas recirculation system or also a tank ventilation system in a preferred manner. In addition, the intake section 1 comprises a manifold 6 and an intake pipe 7, which is guided to a cylinder Z1 via an intake port in the engine block 2. In addition, the engine block 2 comprises a crankshaft 8 that is connected to the piston 11 of a cylinder Z1 by means of a connecting rod 10.

The cylinder head 3 comprises a valve train with a gas intake valve 12 and a gas exhaust valve 13. In addition, the cylinder head 3 comprises a fuel injection valve 18, by means of which fuel can be metered into the combustion chamber of the cylinder Z1 in a preferred manner.

An exhaust gas catalytic converter 21 is preferably arranged in an exhaust manifold 4. If required, a particle filter can also be arranged in addition in the exhaust manifold. In addition, provision has been made for an exhaust gas recirculation system, which is designed to feed back the exhaust gas from the exhaust manifold 4 to the intake section 1. Over and above that, provision has also been made for an exhaust gas turbocharger in a preferred manner.

A control device 25 is provided for the internal combustion engine to which sensors have been assigned, said sensors detecting the different measured variables and in each case determining the value of the measured variables. The measured variables and the variables deduced from the measured variables together form the operating variables. The control device 25 determines, as a function of at least one of the measured variables BG, the correcting variables, which are then converted into one adjusting signal or several adjusting signals SG for controlling the final control elements by means of corresponding actuators.

The control device 25 can also be referred to as a device for controlling an internal combustion engine.

The sensors are a pedal position indicator 26, which detects the position of an gas pedal 27, an air mass flow sensor 28 which detects an air mass flow upstream of the throttle valve 5 in the intake section, a first temperature sensor 32 which detects an intake air temperature, a crankshaft angle sensor 36 which detects a crankshaft angle to which a rotational speed N is allocated. In addition, provision has been made for a second temperature sensor 38 which detects a coolant temperature or a fuel temperature. Depending on the embodiment, there can be any subset of the mentioned sensors or there can even be additional sensors.

The final control elements are, for example, the throttle valve 5, the gas intake valve and the gas exhaust valves 12, 13 and the fuel injection valve 18.

In addition to the cylinder Z1, additional cylinders Z2 to Z4 are preferably supplied to which then corresponding final control elements and, if required, sensors have also been allocated. In this way, the internal combustion engine can also have any number of cylinders Z1 to Z4.

A program for controlling an internal combustion engine is stored in a memory of the control device 25 and is preferably started close to a start of the internal combustion engine in a step S1 (FIG. 2). Variables are initialized in a step S1 if appropriate.

In a step S2, a test is carried out in order to determine whether or not the internal combustion engine is in an operating state BZ, which is a transient operating state BZ_INST. The internal combustion engine is in particular in the transient operating state BZ_INST if one operating variable or a plurality of operating variables have a prescribed minimum dynamic value. Such a transient operating state BZ_INST can for example be taken up if the desired torque to be generated by the internal combustion engine has a prescribed dynamic value, for example, brought about by the driver by operating the gas pedal 27. If the condition of a step S2 is not fulfilled, the processing will be continued in a step S4 in which the program for a waiting period in time T_W to be predetermined or also a corresponding crankshaft angle persists, before the processing is continued anew in a step S2. In this process, the duration period in a step S4 is selected in such a way that the step S2 is executed with suitable frequency, thus for example once per cylinder segment of the internal combustion engine, that is in the case of a four-stroke internal combustion engine with four cylinders, every 180 degrees of the crankshaft angle.

On the other hand, if the condition of a step S2 has been fulfilled, an injection parameter is determined in a step S6 as a function of at least one operating variable BG. In this way, in a step S6, an injection start SOI and/or an injection end EOI is for example determined as a function of the at least one operating variable. The operating variable BG can comprise, together with a step S6, for example the desired torque TQI_SP to be adjusted by the internal combustion engine, the rotational speed N and/or the temperatures determined by the first temperature sensor 32 and/or the second temperature sensor 38 or also further operating variables. The allocation rule in order to determine the injection start SOI and the injection end EOI is given for a steady-state operating state of the internal combustion engine and is preferably determined empirically for example by means of tests on an engine dynamometer and/or by means of simulations and is preferably stored in one or more performance graph in a memory of the control device 25.

In a step S8, a target combustion chamber temperature T_BR_SP is determined as a function of at least one of the operating variables, which preferably comprises a quantity of fuel MFF to be metered and/or a rotational speed N and/or a torque TQI_SP to be set. The quantity of fuel to be metered MFF is determined definitively as a function of an operating variable that characterizes the load to be adjusted in the internal combustion engine, such as for example the desired torque TQI_SP to be adjusted. This takes place according to the procedure of a step S6 preferably as a function of one performance graph or a plurality of performance graphs stored in a memory of the control device. Over and above that, it is also still possible in the case of determining the target combustion chamber temperature also to take into account further operating variables such as for example an exhaust gas return rate or the intake air temperature specifically under the assumption of the steady-state operating state.

In a step S10, a filter time constant t_eng is determined specifically as a function of at least one operating variable BG, which is preferably the air mass flow. This can likewise take place as a function of at least one performance graph.

Provision has been made for a filter in a step S12, which is preferably a filter of the first order (such as for example a PT1 filter), the filter time constant of which is t_eng and on the inlet side of which the target combustion chamber temperature T_BR_SP is present and on the outlet side, an actual combustion chamber temperature T_BR_AV is output. By means of the steps S8 to S12, a physical model is implemented for the transient operation in order to determine the actual combustion chamber temperature T_BR_AV. Therefore, it is possible in this way to carry out a sufficiently accurate estimation of the actual combustion chamber temperature also during the transient operation of the internal combustion engine. In this way, the combustion chamber temperature may refer to the temperature in the combustion chamber for example at a predeterminable crankshaft angle during the working cycle in question. The combustion chamber temperature preferably corresponds to a maximum temperature within the working cycle in question.

In a step S14, one correction value or a plurality of correction values are determined specifically as a function of the target combustion chamber temperature T_BR_SP and the actual combustion chamber temperature T_BR_AV. In the case of the execution of a step S14, a correction value KOR_SOI is preferably determined for the injection start and/or a correction value KOR_EOI for the injection end as a function of the target combustion chamber temperature and the actual combustion chamber temperature T_BR_AV. In this process, the deviation and in particular the difference between the target combustion chamber temperature T_BR_SP and the actual combustion chamber temperature T_BR_AV is used in a preferred manner.

The determining of the correction values can for example take place by means of a further physical model, which preferably comprises one correction value or a plurality of correction values and in particular takes the form of pilot control.

Subsequently, in a step S16 an adjusting signal SG is determined in order to activate the injection valve 18 in question which is allocated to the respective cylinders Z1 to Z4 specifically as a function of at least one injection parameter and/or at least one correction value. In this way the adjusting signal is for example determined as a function of the injection start SOI and/or the injection end EOI and/or the correction value KOR_SOI for the injection start and/or the correction value KOR_EOI for the injection end. The injection start SOI and the injection end EOI in each case refer to the crankshaft angle of the crankshaft 8. The injection valve 18 in question is then activated in accordance with the adjusting signal SG determined in a step S16 for the metering of fuel in the respective combustion chamber of the respective cylinders Z1 to Z4. Following the processing of a step S16, the processing is continued in a step S4.

As an alternative or also as an addition to a step S6, provision can be made for a step S18 by means of which a main injection quantity MFF_M and/or a pre-injection quantity MFF_PILOT is determined as a function of at least one operating variable BG. This one operating variable BG preferably comprises a value characterizing the load to be set in the case of the internal combustion engine such as for example a desired torque to be set by means of the internal combustion engine and a rotational speed in a preferred manner. However, this may also comprise further operating variables BG. The allocation rule or the allocation rules in a step S18 also likewise comprise one performance graph or a plurality of performance graphs in a preferred manner.

As an alternative or as an addition to a step S14, provision can also have been made in a step S20, in which case a correction value KOR_MFF_M is determined for the main injection specifically as a function of the target combustion chamber temperature T_BR_SP and the actual combustion chamber temperature T_BR_AV. As an alternative or as an addition it is also possible to determine in a step S20, a correction value KOR_MFF_PILOT for the pre-injection as a function of the target combustion chamber temperature T_BR_SP and the actual combustion chamber temperature T_BR_AV. In principle, the allocation rules in order to determine the correction values KOR_MFF_PILOT, KOR_MFF_M correspond to those of a step S14 in a preferred manner. The adjusting signal SG is then also determined in a step S16 as a function of the main injection quantity MFF_M and/or the pre-injection quantity MFF_PILOT and/or the correction value KOR_MFF_PILOT for the pre-injection quantity and/or the correction value KOR_MFF_M for the main injection quantity.

Correction values are predetermined by means of the allocation rules in such a way that also in the case of transient operation, pollutant emissions that are as low as possible, in particular NOX emissions can be guaranteed and a favorable acoustics can also be guaranteed in this case. Over and above that, it can also be optimized to the extent that the production of harmful particulates are minimized or at least kept at a low level.

In particular in this way, it is possible by means of the correction values to decrease sharply or alternatively to extend a delay in the ignition of the air/fuel mixture in the respective combustion chamber compared to the transient state that is the steady-state operating state. In this way, it is first of all for example possible that on increasing the target temperature T_BR_SP as a result of lifting or increasing the quantity of fuel MFF to be metered, the difference between the actual combustion chamber temperature T_BR_AV and the target combustion chamber temperature T_BR_SP then becomes negative and the injection start SOI is corrected in earlier mode. At the same time for example, the correction value KOR_MFF_PILOT is also increased for the pre-injection quantity of fuel MFF_PILOT, which then brings about a torque-neutral transition and by means of the correction values the contribution thereof then becomes increasingly smaller over time until a correction is no longer necessary. In the case of a reduction of the target combustion chamber temperature T_BR_SP, the corresponding sequence takes place accordingly in an inverted manner.

What is claimed is:

1. A method in order to control an internal combustion engine with self-ignition of the air/fuel mixture and the metering of fuel via a fuel injection valve, the method comprising the steps of:
 determining at least one injection parameter with respect to the metering of fuel as a function of at least one operating variable of the internal combustion engine under the assumption of a steady-state operating state,
 in the case of the presence of a transient operating state:
  determining at least one current operating variable;
  determining a target combustion chamber temperature corresponding to an assumed steady-state operating state operating according to the determined at least one operating variable,
  using a predetermined physical model for a transient operation to determine an actual combustion chamber temperature as a function of the target combustion chamber temperature corresponding to the assumed steady-state operating state and at least one of the current operating variables,
  determining, as a function of both (a) the target combustion chamber temperature corresponding to the assumed steady-state operating state and (b) the actual combustion chamber temperature corresponding to the transient operating state, a correction value for the at least one injection parameter and
  controlling the fuel injection valve as a function of the at least one injection parameter and the allocated correction value.

2. The method according to claim 1, wherein the target combustion chamber temperature is determined as a function of at least one of an air mass flow, a rotational speed and a torque to be set.

3. The method according to claim 1, wherein the physical model comprises one filter.

4. The method according to claim 3, wherein the filter is a filter of the first order.

5. The method according to claim 3, wherein a filter time constant is determined as a function of the air mass flow.

6. The method according to claim 1, wherein the injection parameter is a crankshaft-related position of an injection to be carried out.

7. The method according to claim 6, wherein the injection parameter is a crankshaft-related position of a pre-injection to be carried out.

8. The method according to claim 6, wherein the injection parameter is a crankshaft-related position of a main injection to be carried out.

9. The method according to claim 1, wherein the injection parameter is a quantity of fuel to be metered.

10. The method according to claim 9, wherein the injection parameter is a pre-injection quantity.

11. The method according to claim 9, wherein the injection parameter is a main injection quantity.

12. A device for controlling an internal combustion engine with self-ignition of the air/fuel mixture and the metering of fuel by means of a fuel injection valve, the device being operable to
 determine at least one injection parameter with respect to the metering of fuel as a function of at least one operating variable of the internal combustion engine under the assumption of a steady-state operating state,
 on the presence of a transient operating state:
  determine at least one current operating variable;
  determine a target combustion chamber temperature corresponding to an assumed steady-state operating state operating according to the determined at least one operating variable,
  use a predetermined physical model for a transient operation to determine an actual combustion chamber temperature as a function of the target combustion chamber temperature corresponding to the assumed steady-state operating state and at least one of the current operating variables,
  determine, as a function of both (a) the target combustion chamber temperature corresponding to the assumed steady-state operating state and (b) the actual combustion chamber temperature corresponding to the transient operating state, a correction value for the at least one injection parameter and control the fuel injection valve as a function of the at least one injection parameter and the allocated correction value.

13. A device for controlling an internal combustion engine with self-ignition of the air/fuel mixture and the metering of fuel via a fuel injection valve, comprising means:

for determining at least one injection parameter with respect to the metering of fuel as a function of at least one operating variable of the internal combustion engine under the assumption of a steady-state operating state, wherein in the case of the presence of a transient operating state the means:

determine at least one current operating variable;

determine a target combustion chamber temperature corresponding to an assumed steady-state operating state operating according to the determined at least one operating variable, use a predetermined physical model for a transient operation to determine an actual combustion chamber temperature as a function of the target combustion chamber temperature corresponding to the assumed steady-state operating state and at least one of the current operating variables, determine, as a function of both (a) the target combustion chamber temperature corresponding to the assumed steady-state operating state and (b) the actual combustion chamber temperature corresponding to the transient operating state, a correction value for the at least one injection parameter and control the fuel injection valve as a function of the at least one injection parameter and the allocated correction value.

14. The device according to claim 13, wherein the target combustion chamber temperature is determined as a function of at least one of an air mass flow, a rotational speed and a torque to be set.

15. The device according to claim 13, wherein the physical model comprises one filter.

16. The device according to claim 15, wherein the filter is a filter of the first order.

17. The device according to claim 15, wherein a filter time constant is determined as a function of the air mass flow.

18. The device according to claim 13, wherein the injection parameter is a crankshaft-related position of an injection to be carried out.

19. The device according to claim 18, wherein the injection parameter is a crankshaft-related position of a pre-injection to be carried out.

20. The device according to claim 18, wherein the injection parameter is a crankshaft-related position of a main injection to be carried out.

* * * * *